(12) United States Patent
Segerljung

(10) Patent No.: US 7,444,808 B2
(45) Date of Patent: Nov. 4, 2008

(54) HYDRAULIC SYSTEM

(75) Inventor: Max Segerljung, Vännäs (SE)

(73) Assignee: Stock of Sweden AB, Strömsund (SE)

( * ) Notice: Subject to any disclaimer, the term of this patent is extended or adjusted under 35 U.S.C. 154(b) by 0 days.

(21) Appl. No.: 10/521,212

(22) PCT Filed: Jul. 15, 2003

(86) PCT No.: PCT/SE03/01213

§ 371 (c)(1), (2), (4) Date: Jan. 13, 2005

(87) PCT Pub. No.: WO2004/007974

PCT Pub. Date: Jan. 22, 2004

(65) Prior Publication Data

US 2005/0235638 A1    Oct. 27, 2005

(30) Foreign Application Priority Data

Jul. 15, 2002    (SE) .................................... 0202203

(51) Int. Cl.
F16D 31/02    (2006.01)
(52) U.S. Cl. .......................................... 60/414; 60/474
(58) Field of Classification Search .................. 60/414, 60/475, 476, 474
See application file for complete search history.

(56) References Cited

U.S. PATENT DOCUMENTS

| | | | | |
|---|---|---|---|---|
| 3,903,698 A | * | 9/1975 | Gellatly et al. ................ | 60/476 |
| 4,761,954 A | * | 8/1988 | Rosman ........................ | 60/414 |
| 4,961,316 A | * | 10/1990 | Corke et al. .................. | 60/476 |
| 5,144,801 A | * | 9/1992 | Scanderbeg et al. ........... | 60/475 |
| 5,329,767 A | * | 7/1994 | Hewett ......................... | 60/414 |

FOREIGN PATENT DOCUMENTS

| | | |
|---|---|---|
| DE | 4328906 | 3/1995 |
| DE | 10021823 | 11/2001 |
| EP | 1213486 | 6/2002 |

* cited by examiner

*Primary Examiner*—F. Daniel Lopez
(74) *Attorney, Agent, or Firm*—Dilworth & Barrese LLP

(57) ABSTRACT

The invention concerns a hydraulic system comprising at least one hydraulic drive means (1), a conduit system (10) connected to the hydraulic drive means for conveying hydraulic liquid to and from the hydraulic drive means, where the conduit system comprises a conduit circuit (11) containing hydraulic liquid, connected to the hydraulic drive means, a pump (12) for generating a flow of hydraulic fluid in the conduit system and a motor (13) to power the pump. The pump (12) is arranged to control the flow of hydraulic liquid in said circuit (11), and the hydraulic drive means (1) is controllable substantially only by controlling the flow of hydraulic liquid in said circuit (11) by means of the pump (12).

22 Claims, 1 Drawing Sheet

HYDRAULIC SYSTEM

BACKGROUND OF THE INVENTION AND PRIOR ART

The invention concerns a hydraulic system, comprising at least one hydraulic drive means, a conduit system connected to the hydraulic drive means for conveying hydraulic liquid to and from the hydraulic drive means, where the conduit system comprises a conduit circuit containing hydraulic liquid, connected to the hydraulic drive means, a pump for generating a flow of hydraulic fluid in the conduit system and a motor to power the pump.

Hydraulic systems of the type mentioned in the introduction are known and are used in a large number of different technical fields. For example one or more hydraulic cylinders in such a hydraulic system can be used in an industrial truck to control its lifting movements, i.e. control of the truck's handling of a load including raising and lowering the load, and even horizontal movements of the load. Further examples of technical fields where the said type of hydraulic system can be applied include all sorts of working machines, such as digging machines for control of the digging machine's digging movements, tool machines, robots and such for example.

In hydraulic systems of the said type the motor's power is transformed to hydraulic power in the pump, whereby the flow of hydraulic liquid in the conduit system generated by the pump is usually distributed to the at least one hydraulic drive means via one or more valves. By controlling the flow to at least one hydraulic drive means via valves, such as throttle valves or directional valves for example, the hydraulic drive means is thereby controlled. However, a disadvantage with such a hydraulic system is that heat is generated on controlling the flow with throttle valves, which has a negative effect on the components comprised in the system and therefore the installation of expensive cooling systems requires in certain cases. The generation of heat also involves a disadvantageous energy loss.

SUMMARY OF THE INVENTION

The aim of the present invention is to provide therefore a hydraulic system that allows a more effective utilisation of the energy consumed than in hydraulic systems according to the prior art.

This aim is achieved according to the invention with a hydraulic system of the type mentioned in the introduction, in which the pump is arranged to control the flow of hydraulic liquid in said circuit, and the hydraulic drive means is controllable substantially only by controlling the flow of hydraulic liquid in said circuit by means of the pump.

Due to the fact that the hydraulic drive means is controllable substantially only by controlling the flow of hydraulic fluid in said circuit by means of the pump, the generation of heat and the energy loss that is associated with controlling the hydraulic drive means by throttling the flow of hydraulic liquid in the conduit system with valves is avoided. Furthermore the pump only has to be powered at those times when the hydraulic drive means is to be operated, which contributes to a reduced energy consumption in the hydraulic system. Furthermore the pump's work is related to the control of the hydraulic drive means. For example a smaller movement of the hydraulic drive means in the form of a hydraulic cylinder requires less work by the pump, on condition that the load on the hydraulic cylinder is not changed. The inventive hydraulic system even allows the use of a reduced amount of hydraulic liquid compared with hydraulic systems according to the prior art, because the control of the hydraulic drive means only requires control of the flow of hydraulic liquid in the conduit circuit connected to the hydraulic drive means, i.e. no superfluous flow of hydraulic liquid needs to be circulated through the conduit system to maintain the desired control of the hydraulic drive means.

According to a preferred embodiment of the invention the hydraulic system comprises means for regenerating mechanical energy transmitted to the hydraulic drive means, due to loading of the hydraulic drive means. It is hereby possible to regenerate energy that is transferred to the hydraulic drive means due to loading of the hydraulic drive means, which can then be utilised in any way.

According to another preferred embodiment of the invention said energy regeneration means include the motor, that is arranged to be driven as a generator by the pump, for regeneration of energy when said mechanical energy transmitted to the hydraulic drive means is transformed to liquid energy in the hydraulic liquid in said circuit and thereby powers the pump. The motor is therefore arranged to both power the pump to control the flow of hydraulic liquid in said circuit and thereby control the hydraulic drive means and to work as generator for regeneration of energy obtained from the hydraulic drive means. No further devices for the regeneration of energy are therefore required.

According to another preferred embodiment of the invention the motor is powered by energy regenerated by said energy regeneration means. A reduced energy consumption by the hydraulic system is consequently made possible in an advantageous way.

advantages, advantageous features and areas of application for the invention will be apparent from the following description.

BRIEF DESCRIPTION OF THE DRAWING

Preferred embodiments of the invention are described below as examples with reference to the attached drawing, in which.

DETAILED DESCRIPTION OF PREFERRED EMBODIMENTS OF THE INVENTION

Figure 1:
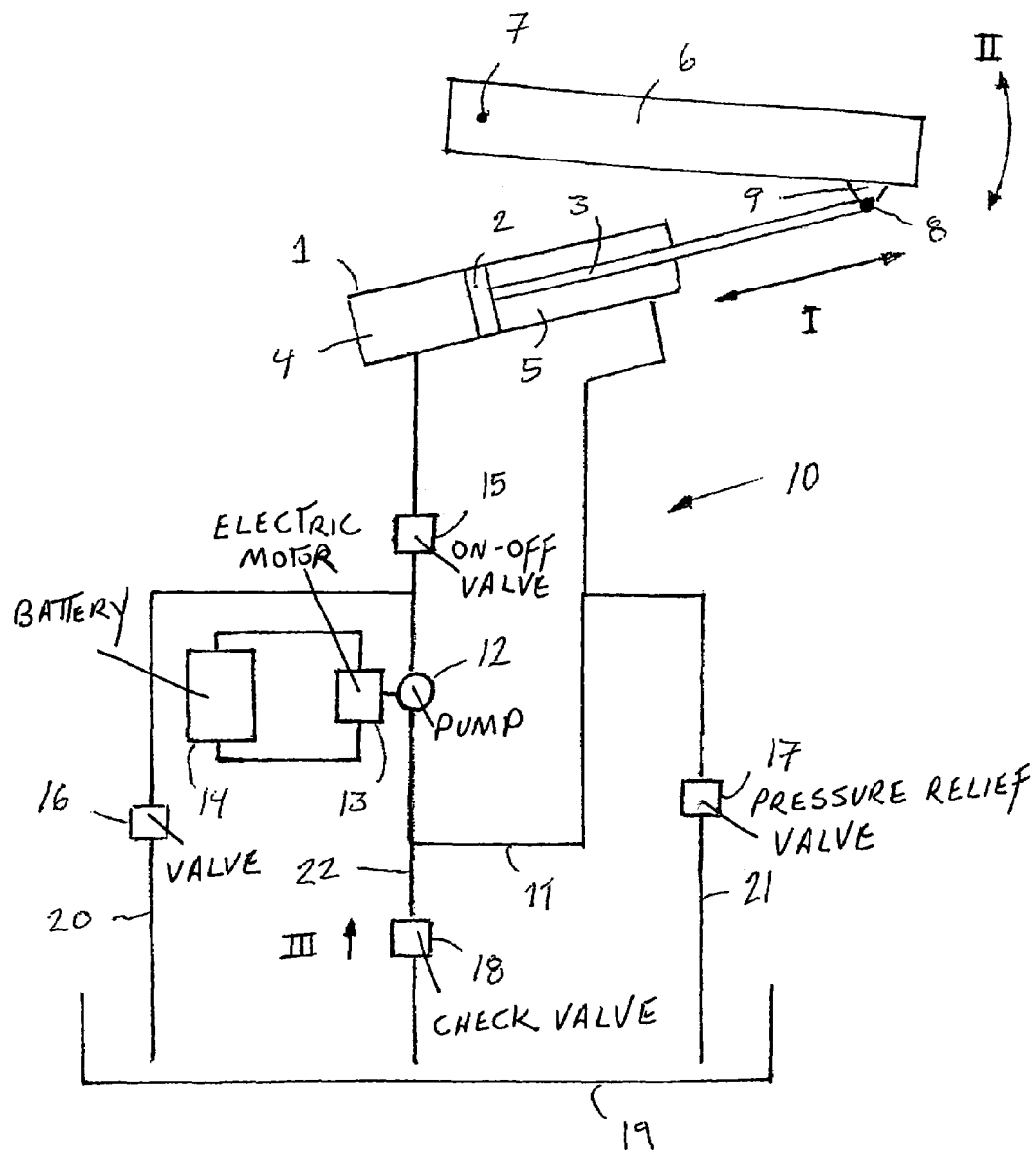
FIG. 1 schematically illustrates a hydraulic system according to a preferred embodiment of the invention.

FIG. 1 schematically illustrates a hydraulic system according to a preferred embodiment of the invention. The hydraulic system illustrated in FIG. 1 comprises a hydraulic drive means in the form of a hydraulic cylinder 1. It is pointed out that this is only a possible embodiment and it is of course possible to provide the hydraulic system with an optional number of hydraulic cylinders, depending on the task that the hydraulic system is intended to carry out. Furthermore it is pointed out that it is even possible to use many other types of hydraulic drive means, such as different types of hydraulic adjusting devices and hydraulic motors for example.

A conduit system, schematically shown by 10, is connected with the hydraulic cylinder to convey hydraulic liquid to and from the hydraulic cylinder 1. A suitable choice of hydraulic liquid is easy for a person skilled in the art to make, so it will not be discussed any further. The conduit system 10 comprises a conduit circuit 11 containing hydraulic fluid connected to the hydraulic cylinder 1. Furthermore the hydraulic system comprises a pump 12 to generate a flow of hydraulic liquid in the conduit system and a motor 13 to power the pump 12. Although the pump 12 and the motor 13 in FIG. 1 are illustrated as separate components it is to be understood that these could be arranged in one and the same unit constituting one component.

The pump 12 is arranged to control the flow of hydraulic liquid in said circuit 11 and the hydraulic cylinder 1 is controllable substantially only by controlling the flow of hydraulic liquid in said circuit 11 by means of the pump 12. The control of the hydraulic cylinder 1 therefore takes place substantially only by controlling the flow of hydraulic liquid in circuit 11 by means of the pump 12 and consequently not by controlling the flow to and from the hydraulic cylinder by means of any valves.

The hydraulic cylinder 1 illustrated in FIG. 1 comprises a piston 2, with which a piston rod is connected. The piston 2 divides the hydraulic cylinder into two separated chambers, namely a first chamber 4 and a second chamber 5. The piston 2 and the piston rod 3 are movable back and forth in the hydraulic cylinder 1. The circuit 11 has a connection to the first chamber 4 and a connection to the second chamber 5.

The pump 12 is preferably arranged to control the direction of the flow of hydraulic liquid in the circuit 11 and thereby to control the direction of action of the hydraulic cylinder 1, i.e. the direction in which the piston 2 and the piston rod 3 will move. By controlling the direction of the flow of hydraulic liquid in circuit 11 the piston 2, and therefore the piston rod 3, can therefore be made to move in the directions shown by the bi-directional arrow I. The flow of hydraulic liquid in one of the two directions in the circuit 11 is therefore generated by means of the pump 12, whereby a higher pressure is generated either in the first chamber 4 or in the second chamber 5, depending on the chosen flow direction of the hydraulic liquid in the circuit 11, which pushes the piston 2 in the chosen direction of the bi-directional arrow I.

The pump 12 is preferably arranged to control the flow rate of hydraulic liquid in the circuit 11 and thereby to control the direction of action of the hydraulic cylinder 1, i.e. the rate at which the piston 2 and the piston rod 3 move in one of the two directions according to the bi-directional arrow I.

According to the embodiment of the invention illustrated in FIG. 1 the motor 13, which powers the pump 12, is arranged to control the pump to control the flow of hydraulic liquid in the circuit 11. The flow in the circuit 11 is therefore controlled by controlling the motor. For example the motor 13 can be arranged so that at high motor revolutions the pump 12 is made to generate a high flow rate in the circuit 11 and at low motor revolutions the pump 12 is made to generate a low flow rate in the circuit 11 respectively. The motor 13 can even be arranged so that at high motor revolutions the pump 12 is made to generate a high pressure in the hydraulic liquid on one side of the pump 12 in the circuit 11 and that at reduced high motor revolutions the pump 12 is made to generate a reduced high pressure in the hydraulic liquid on one side of the pump 12 in the circuit 11.

In the embodiment of the invention illustrated in FIG. 1 a device 14 is connected to the motor 13 to power and control the motor 13, which in turn is arranged to control the pump 12. The device 14 suitably comprises a connection to an energy source to power the motor 13. According to the illustrated embodiment of the invention the motor 13 is electrically powered. The device 14 can for example be connected to an electricity network, but according to this embodiment of the invention batteries, preferably rechargeable batteries, are arranged in the device 14 to power the motor 13. It is of course also possible to arrange the motor 13 to be powered in some other way. The motor 13 could for example be petrol- or diesel-powered.

In the embodiment of the invention illustrated in FIG. 1 the hydraulic cylinder 1 is intended to move a beam 6 that is arranged on an industrial truck for lifting and lowering a load for example. It is emphasized that this example is only cited to explain the invention and should not be interpreted as limiting the present invention. The end 8 of hydraulic cylinder's 1 piston rod 3 which is opposite to the piston 2 is pivotably connected to the beam 6 via an attachment. By controlling the hydraulic cylinder 1 by means of the pump 12 and thereby displacing the piston 2 and the piston rod 3 in the direction of the arrow I, the beam 6, which is pivotable about a pivoting axis 7 can be brought to pivot in the direction of the bi-directional arrow II.

The hydraulic system preferably comprises means for regenerating mechanical energy transmitted to the hydraulic cylinder 1, due to loading of the hydraulic cylinder 1.

On pivoting the beam 6 in the upward direction in FIG. 1 energy is transferred from the hydraulic cylinder 1 to the beam 6. By pivoting the beam gains a higher potential energy. Said energy regeneration means is intended to regenerate mechanical energy that is transferred to the hydraulic cylinder, such as for example by lowering the beam 6 when the beam's potential energy and mechanical energy from another loading of the beam is transferred to the hydraulic cylinder 1. Many types of energy regeneration means are possible within the scope of the invention. For example it would be possible to arrange resilient members to take up, and later use the mechanical energy transferred to the hydraulic cylinder 1.

According to the embodiment of the invention illustrated in FIG. 1 said energy regeneration means includes the motor 13. The motor is arranged to be driven as a generator by the pump 12. On loading of the hydraulic cylinder, such as for example by the beam 6, the mechanical energy is transferred to the hydraulic cylinder 1, where the energy is transformed into liquid energy in the hydraulic liquid in the circuit 11 by the piston 2 of said load being pushed in one of the two directions of the bi-directional arrow I. In this way a flow of hydraulic liquid in the circuit is generated, which powers the pump 12, which in turn powers the motor 13 as a generator for regenerating the mechanical energy transferred to the hydraulic cylinder.

The hydraulic system preferably even comprises means to store regenerated energy. Such energy storage means can include capacitors, different types of accumulators and such. According to the illustrated embodiment of the invention said energy storage means comprises one or more rechargeable batteries arranged in the device 14.

The motor 13 is suitably arranged to be powered by the energy regenerated by said energy regeneration means, which for example can be stored in said energy storage means. This makes a reduction in total energy needed to power the motor possible, which is particularly advantageous in cases where the motor 13 is arranged to be powered by batteries.

The volume of hydraulic liquid in the hydraulic cylinder's 1 first chamber 4 when the piston is located in one of its end positions, the end position to the right in FIG. 1, is larger than the volume of hydraulic liquid in the hydraulic cylinder when the piston 2 is located in its other end position, the end position to the left as illustrated in FIG. 1. The difference between these two volumes is substantially the volume of the piston rod 3 in the second chamber 5. Due to this, the hydraulic liquid has to be supplied or removed from the circuit 11 when the hydraulic cylinder is controlled so that the piston moves inside the hydraulic cylinder 1. Three conduits 20, 21 and 22 are connected to the circuit 11 to supply and remove hydraulic liquid, where the conduits are even connected to a tank for hydraulic liquid, schematically indicated by 19. In order to control the flow of hydraulic liquid between the tank 19 and the circuit 11, valves 16, 17, 18 are arranged in the conduits 20, 21, 22. A valve 16 is arranged in the conduit 20. A valve 18 is arranged in the conduit 22, which in the illustrated embodiment is a so-called one-way valve, i.e. the valve 18 transmits hydraulic liquid in only one direction, which in FIG. 1 is indicated by the arrow III. Furthermore a valve 17 is even arranged in conduit 21.

Furthermore a valve 15 is arranged in circuit 11, which is arranged to be closed and thereby not allow any flow of hydraulic liquid in the circuit 11 when the hydraulic cylinder 1 should not move. On controlling the hydraulic cylinder 1 the valve 15 consequently opens to allow flow of hydraulic liquid in the circuit 11. Lacking such a valve, which prevents flow in circuit 11 in closed position, the load on the hydraulic cylinder via the piston rod 3 would not encounter any resistance, whereby the piston rod 3 and the piston 2 would be able to move in the direction of the arrow I on generation of a flow in the circuit 11. The valve 15 in its closed position is therefore intended to fix the hydraulic cylinder's piston and piston rod in a determined position independently of the amount of load on the hydraulic cylinder.

There now follows a brief description of the function of the hydraulic system in operation according to the embodiment of the invention illustrated in FIG. 1.

When the hydraulic cylinder 1 is to be controlled so that the piston 2 and the piston rod 3 move to the right in FIG. 1, i.e. on raising the beam 6, the pump 12 is controlled by the motor 13 that generates a flow of the hydraulic liquid in the circuit 11 in a clockwise direction. The valves 16 and 17 are hereby kept closed, i.e. no flow of hydraulic liquid is allowed between the tank 19 and the circuit 11 via the conduits 20 and 21. The extra volume of hydraulic liquid which is needed to be supplied to the circuit 11 corresponding to the volume taken up by the piston rod 3 in the hydraulic cylinder 1 is automatically sucked up from the tank by conduit 22 via the one-way valve 18.

On lowering the beam 6, in other words when the hydraulic cylinder 1 is to be controlled so that the piston 2 and the piston rod 3 move to the left in FIG. 1, the valve 15 is opened so that a flow of hydraulic liquid in the circuit 11 is allowed. The mass of the beam 6 and any load on the beam 6, for example the load carried thereupon, load the hydraulic cylinder 1, i.e. push the piston rod 3 to the left in FIG. 1 along the direction of the arrow I, whereby a flow is generated in the hydraulic liquid in the circuit 11 in the anti-clockwise direction. This flow powers the pump 12, which in turn powers the motor 13 which is thereby driven as a generator for regeneration of energy according to the above description. In this way an advantageous utilisation of the mechanical energy which is transferred to the hydraulic cylinder 1 is consequently possible. The regenerated energy can for example be used to recharge the batteries arranged in the device 14 for powering the motor 13. In cases where battery power is utilised such energy regeneration increases the lifetime of the batteries. In the case of a battery-driven vehicle, for example, the energy regeneration results in a longer drive-time between battery charging and a reduction of the risk of involuntary interruption of a work shift in order to charge the batteries.

The flow rate in the circuit 11 on energy regeneration, and thereby the rate of lowering the beam 6, is controlled by powering the motor 13 so that the pump 12 slows down the anti-clockwise flow in the circuit 11, which is generated by the load on the hydraulic cylinder. The superfluous volume of hydraulic liquid due to the volume of the piston rod 3 which, in connection with the flow in the circuit 11 on regeneration of energy, has to be removed from the circuit 11 is instead tapped off by conduit 11 by opening the valve 17.

When the beam is to be lowered further than its position due to its mass and any load on the beam 6, i.e. when the piston 2 and the piston rod 3 are to be moved further to the left in FIG. 1, the pump has to actively generate a flow in the circuit 11 to control the hydraulic cylinder. This occurs for example when it is desired to forcibly press down the beam 6. In order for the hydraulic liquid not to then be forced out into the tank 19 via conduit 21 the valve 17 is closed. The superfluous volume of hydraulic liquid due to the piston rod's 3 volume, which is to be removed from the circuit 11, is instead tapped off via conduits 20 by opening the valve 16.

The invention is of course not in any way limited to the preferred embodiments described above, but a number of modification possibilities thereof should be apparent for the average person skilled in the art without departing from the basic idea of the invention.

The invention claimed is:

1. Hydraulic system, comprising
   at least one hydraulic drive means (1) structured and arranged to be coupled to a load (6) to move the same,
   a conduit system (10) connected to the hydraulic drive means (1) for conveying hydraulic liquid to and from the hydraulic drive means (1),
   the conduit system comprising
   a single pump (12) having a first outlet connected to a first port of said hydraulic drive means (1) by a first passage and a second outlet connected to a second port of said hydraulic drive means (1) by a second passage, and structured and arranged for generating a flow of hydraulic fluid in the conduit system (10), and
   a motor (13) structured and arranged to power the pump (12), wherein
   the pump (12) is structured and arranged to control the flow of hydraulic liquid in said passages,
   the hydraulic drive means (1) is structured and arranged to be controllable substantially only by controlling the flow of hydraulic liquid in said passages by the pump (12),
   a single valve (15) is positioned in only one of said first and second passages and structured and arranged to fix the hydraulic drive means (1) in position when closed, with the other of said first and second passages being devoid of a valve,
   said single valve (15) being positioned in only said first or second passage without intervening conduit lines being joined to said first or second passage between said single valve (15) and hydraulic means (1), and
   said single pump (12) has only two outlets and is structured and arranged to
   (i) pump fluid in one direction to the hydraulic means (1) through said single valve (15) to move the load (6) coupled to the hydraulic means (1), and
   (ii) receive energy from the load (6) through the hydraulic means (1) causing fluid to flow in an opposite direction through said single pump (12) and transfer this energy to said motor (13).

2. Hydraulic system according to claim 1, wherein the pump (12) is arranged to control direction of the flow of hydraulic liquid in said passages and thereby control the direction of action of the hydraulic drive means (1).

3. Hydraulic system according to claim 2, wherein the pump (12) is arranged to control the flow rate of the hydraulic liquid in said passages and thereby control the effective rate of the hydraulic drive means (1).

4. Hydraulic system according to claim 1, wherein the pump (12) is arranged to control the flow rate of the hydraulic liquid in said passages and thereby control the effective rate of the hydraulic drive means (1).

5. Hydraulic system according to claim 1, wherein the motor (13), that powers the pump (12), is arranged to control the pump to control the flow of hydraulic liquid in said passages.

6. Hydraulic system according to claim 1, wherein said motor (13) is an electrically driven motor.

7. Hydraulic system according to claim 1, wherein said energy regeneration means include the motor (13), that is arranged to be driven as a generator by the pump (12), for regeneration of energy when said mechanical energy transmitted to the hydraulic drive means (1) is transformed to liquid energy of the hydraulic liquid in said passages and thereby powers the pump (12).

8. Hydraulic system according to claim 7, wherein it comprises means to store regenerated energy.

9. Hydraulic system according to claim 1, wherein it comprises means to store regenerated energy.

10. Hydraulic system according to claim 9, wherein said energy storage means comprises at least one rechargeable battery.

11. Hydraulic system according to claim 1, wherein the motor (13) is powered by the energy regenerated by said energy regenerated means.

12. Hydraulic system according to claim 11, wherein the motor (13) is powered by regenerated energy stored in said energy storage means.

13. Hydraulic system according to claim 1, wherein the hydraulic drive means (1) is a hydraulic cylinder.

14. Hydraulic system according to claim 13, wherein the hydraulic cylinder has chambers (4,5) containing hydraulic liquid, arranged on opposite sides of a piston (2), with a piston rod (3) connected to the piston received in one chamber (5), and the system comprises an arrangement (16-22) arranged to provide a supply of hydraulic liquid to said passages on controlling the hydraulic cylinder (1) to move the piston in a direction for reducing the volume of said one chamber (5) and to tap hydraulic liquid from the passages on movement of the piston in the opposite direction.

15. Hydraulic system according to claim 14, wherein the arrangement comprises at least two conduits (21,22) connected to a tank (19) for hydraulic liquid and to the passages via a valve (17,18) situated in each said conduit (21,22).

16. Hydraulic system according to claim 15, wherein a first (22) of the conduits (21,22) connected to the hydraulic liquid tank (19) has a one-way valve (18) that only makes the flow of hydraulic liquid from the tank (19) to the passages possible to supply hydraulic liquid to the passages on movement of the piston in the direction for reducing the volume in said one chamber (5) when the valve (17) is closed in the second conduit (21) to the tank (19), whereby the second conduit (21) is connected to the passages nearer to said one chamber (5) than to the first conduit (22).

17. Hydraulic system according to claim 16, wherein the valve (17) in the second conduit (21) is controllable to be open when the piston is displaced in the direction for reducing the volume in said one chamber (5).

18. Hydraulic system according to claim 17, wherein the arrangement comprises a third conduit (20) connected, via a valve (16), to the hydraulic liquid tank (19) which is connected to the passages on the opposite side of the first conduit's (22) connection thereto relative to the second conduit (21), and the valve (17) in the second conduit (21) is controllable to be closed and the valve (16) in the third conduit (20) is controllable to be open simultaneously when the piston is displaced in the direction for reducing the volume in said one chamber (5).

19. Hydraulic system according to claim 16, wherein the arrangement comprises a third conduit (20) connected, via a valve (16), to the hydraulic liquid tank (19) which is connected to the passages on the opposite side of the first conduit's (22) connection thereto relative to the second conduit (21), and the valve (17) in the second conduit (21) is controllable to be closed and the valve (16) in the third conduit (20) is controllable to be open simultaneously when the piston is displaced in the direction for reducing the volume in said one chamber (5).

20. Hydraulic system according to claim 1, wherein
said hydraulic drive means (1) comprises a cylinder (1) and a piston (2) connected to a piston rod (3) and movably positioned within said cylinder (1) to divide said cylinder (1) into two separated chambers (4,5), and
with said single valve (15) positioned in said first or second passage between said pump (12) and one (4) of said two separated chambers (4,5) within said cylinder (1).

21. Hydraulic system according to claim 1, wherein
said hydraulic drive means (1) comprises a cylinder (1) and a piston (2) connected to a piston rod (3) and movably positioned within said cylinder (1) to divide said cylinder (1) into two separated chambers (4,5), and
said piston rod (3) is coupled to the load (6) such that upon opening of said single valve (15), the load (6) moves said piston (2) generating flow of hydraulic liquid in the direction opposite to flow generated by said pump (12) to power said pump (12) and transfer the energy to said motor (13).

22. Hydraulic system according to claim 21, wherein said pump (12) is additionally powered by said motor (13) to control rate of movement of said piston (2) by the load (6).

* * * * *